United States Patent [19]

Fairweather et al.

[11] Patent Number: 4,564,508

[45] Date of Patent: Jan. 14, 1986

[54] PROCESS FOR THE RECOVERY OF SODIUM CARBONATE FROM SALT MIXTURES

[75] Inventors: Michael J. Fairweather; Michael A. Rockandel, both of Rossland, Canada; Abraham Sadan, Salt Lake City, Utah; Godefridus M. Swinkels, Rossland, Canada

[73] Assignee: Cominco Ltd., Vancouver, Canada

[21] Appl. No.: 642,797

[22] Filed: Aug. 21, 1984

[51] Int. Cl.$^4$ .......................... C01D 17/14; B01D 9/00
[52] U.S. Cl. ................................ 423/189; 423/206 T; 423/425; 23/298; 23/302 T
[58] Field of Search ........... 423/188, 189, 190, 206 T, 423/421, 422, 425, 427; 23/295 S, 298, 302 T

[56] References Cited

U.S. PATENT DOCUMENTS

| | | | |
|---|---|---|---|
| 1,319,128 | 10/1919 | Watson | 423/425 |
| 1,618,834 | 2/1927 | Kuhnert | 23/302 T |
| 1,618,835 | 2/1927 | Kuhnert | 423/189 |
| 1,836,426 | 12/1931 | Allen et al. | 423/191 |
| 1,836,427 | 12/1931 | Allen et al. | 23/302 T |
| 1,853,275 | 4/1932 | Houghton et al. | 23/302 T |
| 2,348,164 | 5/1944 | Black et al. | 23/302 T |
| 2,392,888 | 1/1946 | Suhr et al. | 23/302 T |
| 2,540,648 | 2/1951 | Blackmun | 423/188 |
| 3,119,655 | 1/1984 | Frint et al. | 423/206 T |
| 3,372,691 | 3/1968 | Shachar | 423/206 T |
| 3,656,892 | 4/1972 | Bourne et al. | 423/206 T |
| 3,780,160 | 12/1973 | Waggener et al. | 423/206 T |
| 4,088,451 | 5/1978 | Sadan | 23/302 T |
| 4,179,493 | 12/1979 | Sadan | 423/206 T |
| 4,244,351 | 1/1981 | Loeb et al. | 423/206 T |
| 4,286,697 | 9/1981 | Booth, Jr. et al. | 23/302 T |
| 4,291,002 | 9/1981 | Arnold et al. | 423/189 |
| 4,333,736 | 6/1982 | Schaclar | 23/302 T |

FOREIGN PATENT DOCUMENTS

6145 of 1903 United Kingdom ............ 423/206 T

*Primary Examiner*—Gary P. Straub
*Attorney, Agent, or Firm*—Stevens, Davis, Miller & Mosher

[57] ABSTRACT

Mined salt mixtures comprising sodium-carbonate, -bicarbonate, -chloride, -sulfate, and -double salts, such as trona and burkeite, are leached with a bicarbonate-saturated solution and added carbon dioxide to selectively dissolve the sodium chloride, sodium sulfate and burkeite and to precipitate additional trona, leaving a leach residue consisting essentially of trona. The trona is calcined and dissolved, and the carbonate solution is purified, crystallized and dehydrated in a non-convective solar pond yielding high purity sodium carbonate monohydrate which is converted into dense soda ash. The brine solution from the leach may be treated for the recovery of a further amount of trona.

10 Claims, 6 Drawing Figures

FIG. 2.

PROCESS FOR THE RECOVERY OF SODIUM CARBONATE FROM SALT MIXTURES

This invention relates to a process for the recovery of sodium carbonate from salt deposits and, more particularly, relates to a process for the recovery of soda ash from mixtures containing sodium-carbonate, -bicarbonate, -sulfate and -chloride, and sodium double salts.

BACKGROUND OF THE INVENTION

Many processes have been developed for the recovery of soda ash from salts such as occur in the brines of Searles Lake and Owens Lake in California, and in the relatively pure solid trona deposits of Wyoming. The solid salt mixtures and brines usually include sodium carbonate, sodium bicarbonate, sodium sulfate, sodium chloride, potassium salts and boron salts, and double salts such as trona, burkeite and glaserite.

Known processes for the treatment of trona include the sodium sesquicarbonate process and the monohydrate process. The former includes the saturation of boiling mother liquor with trona, clarification of the solution, removal of organic impurities, crystallization of sodium sesquicarbonate and calcination to sodium carbonate. The latter includes the decomposition of trona by calcination followed by leaching, liquid-solid separation, removal of organics and evaporation above 100° C. to obtain sodium carbonate monohydrate which is calcined to anhydrous sodium carbonate. Without additional elaborate processing, these processes cannot be used for the treatment of salts with high contents of impurity salts such as chlorides and sulfates.

Searles Lake and Owens Lake salts and brines have been treated in the past by processes which mainly include the manipulation of brines in the burkeite field of the carbonate-sulfate-chloride phase diagram. Such processes are disclosed, for example, in U.S. Pat. Nos. 1,836,426, 1,836,427, 1,853,275, 2,348,164 and 2,392,888. These processes are all carried out so that either burkeite or sodium sulfate is precipitated. A major disadvantage of these processes is the need for excessive processing to recover the sodium carbonate from the burkeite and to recover the sodium carbonate in a satisfactorily pure form. According to U.S. Pat. No. 1,618,834, Owens Lake brine, or similar brines, is saturated and carbonated at 30°-45° C. with an amount of carbon dioxide sufficient to cause the precipitation of sodium sesquicarbonate (trona), which is separated from mother liquor, washed and further treated for the recovery of soda ash. The addition of a larger than sufficient amount of carbon dioxide would cause precipitation of sodium bicarbonate which is undesirable because of problems with the separation and purification of the sodium bicarbonate. It has been known, as is stated, to precipitate bicarbonate and then mix precipitated bicarbonate with sodium carbonate solution so as to cause precipitation of sesquicarbonate. As is stated in U.S. Pat. No. 1,853,275, the carbonation processes require the need of burning limestone to generate the carbon dioxide. It is also stated in the same patent that the trona in the Owens Lake deposit does not lend itself to form the basis of an economical process for the manufacture of soda ash. It is also noted that the carbonation processes disclosed in U.S. Pat. No. 1,618,834 are directed solely to the treatment of brine and not of solid salt mixtures. Many other processes, which may include dissolution of solid salts, followed by evaporation, concentration and fractional crystallization to effect separation of salts and recovery of the desired salt specie(s) from salt solutions, are expensive because elaborate and expensive equipment and large amounts of energy are required. The energy requirements can be considerably reduced by using a non-convective solar pond for the crystallization and dehydration of sodium carbonate decahydrate to its monohydrate form. The crystallization and dehydration of sodium carbonate decahydrate is disclosed in U.S. Pat. No. 4,179,493, according to which a sodium carbonate solution is added to a non-convective solar pond, the solution exceeds its solubility in the upper layer of the pond, decahydrate crystallizes and the crystals settle to the bottom of the pond where they are dehydrated. The process is directed to the treatment of solutions containing a single salt and does not disclose the possibility of treating salt mixtures for the separation and purification of sodium carbonate from such mixtures.

SUMMARY OF THE INVENTION

It has now been found that, contrary to negative statements in the prior art, solid salt mixtures such as occur, for example, at Owens Lake can be manipulated to achieve a substantial separation of trona from impurity salts based on the $Na_2CO_3$—$NaHCO_3$—$Na_2SO_4$ phase diagram and particularly the trona and bicarbonate equilibrium areas in the diagram; the phase system being unsaturated with respect to sodium chloride. The trona can be treated to produce pure sodium carbonate monohydrate suitable for conversion to dense soda ash substantially free of salt impurities.

More particularly, it has been found that when a salt mixture essentially containing sodium-carbonate, -bicarbonate, -sulfate and -chloride, and burkeite and trona is treated with a sodium bicarbonate saturated solution and, in some cases, with the addition of a controlled amount of carbon dioxide, the sodium chloride, sodium sulfate and burkeite are preferentially dissolved without dissolving trona, leaving essentially trona in the solids. Furthermore, additional trona is precipitated during the leach by solubility depression, precipitation from recycled solution and the reaction of any added carbon dioxide with dissolved sodium carbonate decahydrate (natron) and sodium carbonate from dissolved burkeite. The impure trona is separated and treated for the recovery of dense soda ash.

It has also been found, surprisingly, that sodium carbonate obtained from the trona is economically and easily purified for the removal of minor amounts of entrained salt impurities and insoluble material and is converted into a pure sodium carbonate monohydrate in a non-convective solar pond, followed by conversion of the so-purified monohydrate into dense soda ash.

It is an object of the present invention to provide a process for the recovery of dense soda ash from a salt mixture containing sodium-carbonate, -bicarbonate, -sulfate and -chloride.

It is another object to selectively leach sodium sulfate and sodium chloride from a mixture with sodium carbonate and sodium bicarbonate and thereby to obtain trona, which is treated for the recovery of substantially pure sodium carbonate monohydrate suitable for conversion to dense soda ash.

It is a further object to selectively leach sodium sulfate, sodium chloride and burkeite from a salt mixture containing sodium carbonate, -bicarbonate, -chloride and -sulfate, burkeite and trona, to form trona, which is converted to sodium carbonate, and to separate any residual sodium sulfate, sodium chloride and other impurity salts from the carbonate in a non-convective, solar pond to obtain high purity sodium carbonate monohydrate.

In its broad aspect, there is provided a process for the recovery of sodium carbonate from salt deposits comprising sodium carbonate, sodium bicarbonate, sodium sulfate, sodium chloride, trona and burkeite, which process comprises subjecting solid raw salt obtained from such deposits to a raw salt leach with a solution substantially saturated with sodium bicarbonate whereby the sodium sulfate, sodium chloride and burkeite are preferentially dissolved into a leach solution and the trona is substantially left in a leach residue, precipitating additional trona by the reaction of dissolved sodium carbonate and sodium carbonate dissolved from burkeite and from natron with sodium bicarbonate, separating the leach solution enriched in sodium sulfate and sodium chloride from the leach residue substantially consisting of trona, and converting said trona in the leach residue to dense soda ash.

Preferably, a controlled amount of carbon dioxide may be added to the raw salt leach, said amount being sufficient to maintain said leach saturated with both trona and sodium bicarbonate.

According to one embodiment, there is provided a process for the recovery of sodium carbonate from solid salt deposits comprising sodium carbonate, sodium bicarbonate, sodium sulfate, sodium chloride, trona, burkeite and insolubles, which process comprises the steps of: subjecting the solid salts to a size reduction in a brine yielding a slurry substantially saturated with respect to sodium bicarbonate; retaining said slurry in a raw salt leach at a temperature above about 15° C. for a period of time and adding a controlled amount of carbon dioxide, said time and said amount of carbon dioxide being sufficient to form a raw salt leach slurry comprising fines and insolubles and consisting of a raw salt leach residue consisting mainly of trona and a raw salt leach solution consisting of substantially J brine, said J brine approaching saturation with respect to sodium bicarbonate, trona and sodium sulfate and containing above about 5% sodium chloride; separating said raw salt leach residue from said raw salt leach solution in a liquid-solids separation; calcining the separated raw salt leach residue in a calcination to obtain impure sodium carbonate; dissolving said impure sodium carbonate in a portion of withdrawn solution in a dissolution to obtain an impure sodium carbonate solution containing sodium chloride, sodium sulfate and insolubles; separating the insolubles from said impure sodium carbonate solution; feeding said impure sodium carbonate solution to a nonconvective, solar pond for the purification-dehydration of sodium carbonate; removing pure sodium carbonate monohydrate from the bottom of said pond; withdrawing solution from the top of said pond; feeding a first portion of said withdrawn solution to said dissolution; combining said impure sodium carbonate solution with a second portion of said withdrawn solution after separating the insolubles from said impure sodium carbonate solution and prior to feeding said impure sodium carbonate solution to said pond; and converting said pure sodium carbonate monohydrate to dense soda ash.

Preferably, the dissolution is carried out between 30° and 60° C.; the impure sodium carbonate solution fed to said non-convective solar pond is unsaturated with respect to sodium carbonate, the unsaturated impure sodium carbonate solution is distributed to one area of the top layer of said pond and solution is withdrawn from the top layer of the pond at a location removed from the area of distribution of the unsaturated impure sodium carbonate solution; water evaporated from the pond is replenished; and the pond depth of up to about 3 m is constant, preferably between 1 and 2 m. According to a preferred embodiment, the liquid-solids separation is carried out in two stages in which the liquid-solids separations comprise the steps of passing the raw salt leach slurry to a thickener; adding to the thickener underflow a suitable flocculant; treating the thickener underflow with added flocculant on a horizontal belt filter; removing the thickener overflow and the liquid fraction from said belt filter consisting of substantially J brine from the process; and passing the solids fraction from said belt filter to said calcination. A portion of the removed J brine may be recycled to the raw salt leach and a portion of the removed J brine may be carbonated, the sodium bicarbonate crystallized and the crystallized sodium bicarbonate passed to said calcination.

DESCRIPTION OF THE DRAWINGS

The embodiments of the process of the present invention will be described with reference to the accompanying drawings, wherein.

DETAILED DESCRIPTION

The salt mixtures treated according to the process of the invention are obtained by mining salt deposits such as occur, for example, at Owens Lake. The main components of such solid salt mixtures are a solid phase consisting mainly of sodium carbonate decahydrate, sodium chloride, sodium sulfate decahydrate, trona ($Na_2CO_3 \cdot NaHCO_3 \cdot 2H_2O$) and burkeite ($Na_2CO_3 \cdot 2Na_2SO_4$), as well as water insoluble clays, slimes and sand, and a liquid phase comprising sodium-carbonate, -bicarbonate, -chloride, and -sulfate. The insoluble clays, slimes and sand will be referred to hereinafter as insolubles. The mixtures contain usually also salts of potassium and boron. Although the invention pertains specifically to the treatment of the Owens Lake salt deposit, it is understood that the process is also suitable for treating salt mixtures from other deposits which are of a similar nature.

When the salt mixtures are contacted in a raw salt leach with a solution substantially saturated with sodium bicarbonate, the burkeite, sodium chloride, sodium sulfate and sodium carbonate decahydrate dissolve from the salt mixture into a brine leaving behind the trona and the sodium bicarbonate. During the contacting, sodium bicarbonate and the dissolved sodium carbonate decahydrate and the sodium carbonate freed from the burkeite react to form trona, which precipitates. Upon completion of the reactions, the composition of the solids is that of trona and substantially no free sodium bicarbonate is left.

Figure 1:
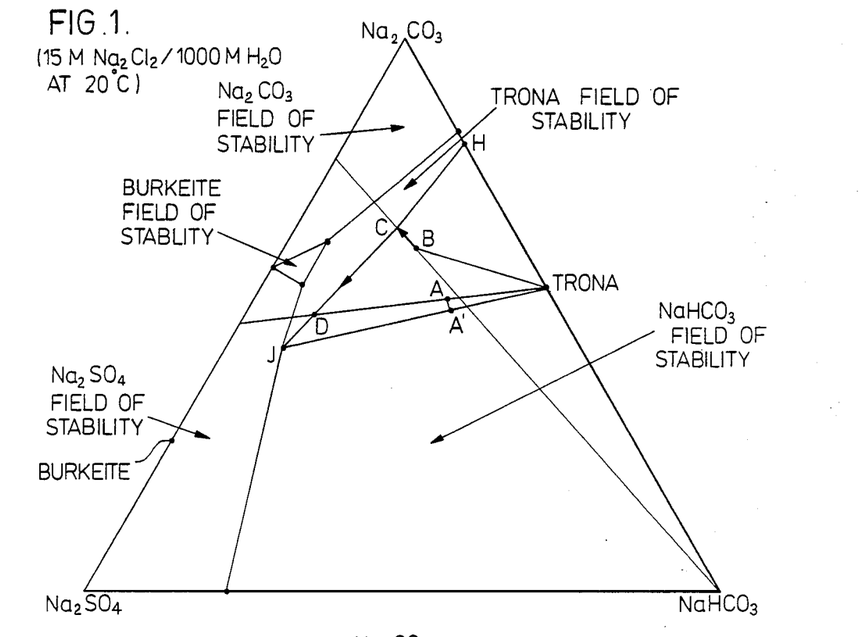
FIG. 1 shows the $Na_2CO_3$—$NaHCO_3$—$Na_2SO_4$ phase diagram wherein the manipulation of the mixtures treated in the salt leach is indicated.

The reactions in the raw salt leach are best illustrated with reference to the $Na_2CO_3$—$NaHCO_3$—$Na_2SO_4$ phase diagram of FIG. 1. This particular diagram shows the 20° C. isotherms for the system of $Na_2CO_3$, $NaHCO_3$ and $Na_2SO_4$ in the presence of sodium chloride. Sodium chloride is usually present in the system in an amount of about 10 to 30 moles $Na_2Cl_2$ per 1000 moles $H_2O$. The amount is insufficient to provide any brine in the process of the invention which is saturated with sodium chloride but sufficient to cause trona to be able to exist as a stable phase. For example, when a salt mixture with the composition A, as indicated in the diagram, is contacted with a sodium bicarbonate-saturated solution of composition B, sodium bicarbonate is precipitated and the compositions of the solution will move along a line through the $NaHCO_3$ point in the diagram which line intersects the trona-bicarbonate fields boundary line, indicated as H–J, at point C. The composition of B will, of course, change with changes in temperature and the composition of the salt mixture. Compositions situated on boundary line H–J represent, of course, compositions saturated with respect to both trona and sodium bicarbonate. Trona will now begin to crystallize as a result of reaction between solid sodium bicarbonate and dissolved sodium carbonate, a major portion of the latter coming from the dissolution of burkeite. The compositions of the brine move along the H–J line during progression of the leach until all the bicarbonate is depleted at point D and the composition of the solids is that of trona. The brine becomes steadily enriched in both sodium sulfate and sodium chloride and partially depleted in carbonate. Further reaction would move the brine composition into the trona field along the extension of line A-Trona which intersects both the H–J line at D and the boundary line between the trona and sodium sulfate fields, and extending into the sodium sulfate field. To maintain the leach saturated with both trona and sodium bicarbonate, carbon-dioxide may be added in a controlled amount. The amount of carbon dioxide depends on the compositions of the salt and brine fed to the leach and must be sufficient to convert the carbonate in the salt mixture of composition A to a composition such as, for example, indicated with $A^1$ such that a line joining trona with $A^1$ extends substantially through point J. The added amount of carbon dioxide will cause the composition of the brine to follow the H–J line, or to have the brine composition return to the H–J line, approaching point J, thus allowing higher concentrations of sodium sulfate. At point J, the composition would reach the invariant solution which is saturated with respect to sodium bicarbonate, trona and sodium sulfate. The brine composition usually approximates the composition of point J, without actually being allowed to reach that composition. The brine substantially of J composition is called J brine hereinafter for sake of convenience. J brine is the solution with the highest sulfate to carbonate ratio and is the best solution for purging sulfate and chloride from the system with trona as the solid product. The J brine is also enriched in sodium chloride but is still unsaturated with respect to this salt. It is understood that the phase diagram at temperatures other than 20° C. and compositions other than the one shown in FIG. 1 has different locations of the phase boundaries and that the principle of the operation remains valid in the operational temperature range of 15° to 40° C. It is also understood that, in some cases, the addition of carbon dioxide may be unnecessary.

Upon completion of the raw salt leach, the salt mixture has essentially formed trona and J brine which are readily separated. The trona can then be treated for the production of dense soda ash. It will, however, be necessary to purify the trona for the removal of residual insolubles and of entrained impurity salts so that the soda ash product has the required purity.

Figure 2:
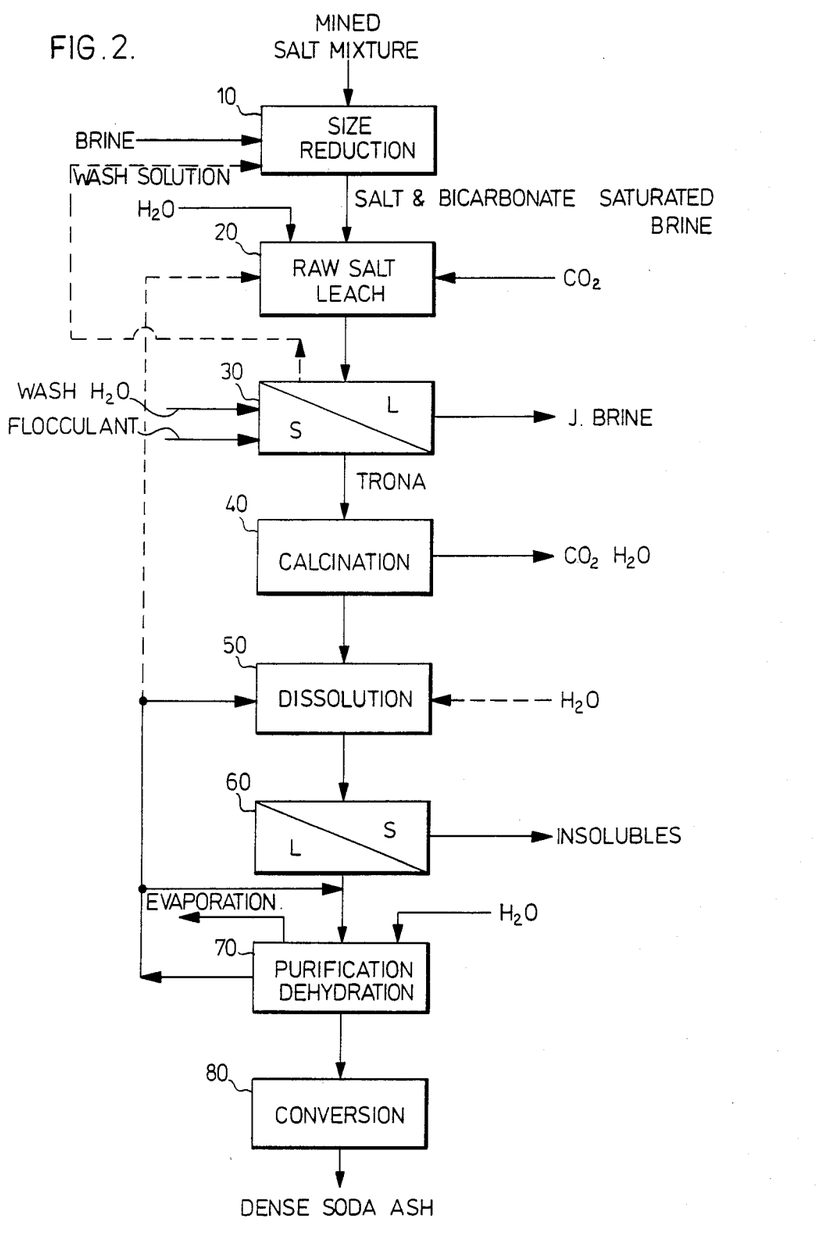
FIG. 2 shows a schematic flowsheet of the main embodiment of the process according to the invention.

With reference now to the flowsheet shown in FIG. 2, raw salt mined from the deposit is subjected to a size reduction 10. The mined raw salt, which is a mixture of solid salts and accompanying brine, is wet-ground in an amount of a sodium carbonate-bicarbonate brine and/or an amount of wash solution from liquid-solids separation 30, to be described, so that a slurry containing about 60% solids is present. During the size reduction of the salt mixture, the brine becomes substantially saturated with respect to sodium bicarbonate. A size reduction to about −28 mesh is considered adequate to achieve efficient leaching. The slurry is passed to the raw salt leach 20.

In raw salt leach 20, which is operated as described with reference to FIG. 1, the slurry, which comprises the substantially sodium bicarbonate-saturated solution, is mixed with additional water as required to form a leach slurry usually containing about 20 to 40% solids. If desired, a small amount of recycle brine saturated with sodium carbonate and purged from the purification-dehydration 70, to be described, may be added, as indicated by the broken line in FIG. 2. The leach slurry is retained in leach 2 for a sufficient length of time, such as from one half to one hour, to allow for the consumption of the sodium bicarbonate and for the formation of solid trona and J brine. The J brine is saturated with respect to sodium sulfate, trona and sodium bicarbonate, and contains an amount of sodium chloride. As pointed out above, the final brine composition is not allowed to reach the J point composition and is controlled at a composition approaching the J point composition. The control is usually effected by the addition of water. During the leaching of the salt mixture, carbon dioxide may be added in a controlled amount, which is sufficient to approximately retain the brine composition in the leach saturated with respect to both trona and sodium bicarbonate and to prevent any precipitation of sodium sulfate. The leach 20 is operated at temperatures above about 15° C. During leaching, the sodium chloride concentration in the J brine increases to about 90 g/L or about 7%, which is well below saturation concentration at the prevailing temperatures. Above about 15° C. and above about 5% sodium chloride in the brine, trona is a stable solid phase in the system. It is, therefore, necessary to maintain conditions at which trona is stable. It is generally unnecessary to provide high or saturated sodium chloride concentrations. The leach may be carried out in one or more vessels, or a compartmented vessel. It is also possible to carry out the size reduction and the leach in the same vessel. The carbon dioxide may be added during the leach in an amount sufficient to maximize the sodium sulfate to sodium carbonate ratio in the brine and to prevent any precipitation of sodium sulfate.

After completion of the leach, the slurry is subjected to a liquid-solids separation 30, wherein the J brine is separated from the trona. The liquid-solids separation 30 can be carried out in one or two stages. Preferably, the separation 30 is carried out in two stages (not shown), the first stage consisting of a thickener and the second stage being a horizontal belt filter. The underflow from the thickener is treated on the belt filter after addition of a suitable flocculant. The thickener overflow and the liquid fraction from the belt filter are J brine. The J brine is removed from the process. If desired, a portion of the J brine may be recycled to raw salt leach 20, while another portion may be treated for crystallization of sodium bicarbonate by carbonation. The crystallized sodium bicarbonate may be recovered or passed to calcination 40. The solids are washed on the belt filter with water and steam and the resulting wash solution is passed to the size reduction 10 as indicated by the interrupted line. The washed solids, consisting mostly of trona, are recovered from the belt filter. The trona, which is impure and still contains a certain amount of entrained impurity salts as well as an amount of insolubles, is passed to calcination 40.

Calcination 40 is done by one of a number of conventional methods to thermally decompose trona to impure sodium carbonate, driving off water vapor and carbon dioxide. The calcination may be carried out in a direct coal-fired kiln at a temperature in the range of about 200° to 400° C., preferably at a temperature of about 200° C. A portion of the off-gases is used to provide the carbon dioxide added in raw salt leach 20. Alternatively, the impure trona can be converted to impure sodium carbonate by wet calcination or by solubilizing the impure trona in the presence of lime to form sodium carbonate and calcium carbonate with subsequent calcination of the calcium carbonate to form lime and carbon dioxide.

The impure sodium carbonate from the calcination 40 is dissolved in dissolution 50 by mixing the calcination product with a portion of the solution withdrawn from the purification-dehydration 70, to be described. This withdrawn recycle solution is usually nearly saturated with respect to sodium carbonate at the surface temperature of the pond in which purification-dehydration 70 is operated, but has the capability of dissolving added carbonate at the higher temperature of dissolution 50. The dissolution is carried out at a temperature above about 30° C., the temperature is preferably maintained in the range of about 30° to 60° C., and sodium carbonate and contained impurity salts are dissolved, leaving any solid insolubles. At 30° C., the solution contains about 30% $Na_2CO_3$ and has a specific gravity of about 1.3. If desired, heat may be supplied to raise the temperature of the dissolution. Following liquid-solids separation 60 for the separation of the insolubles from the impure, sodium carbonate solution, any contained organic material may be removed, if desired, by one of a number of known methods, such as contacting with activated carbon. The insolubles are removed from the process. Following the separation 60, which may be carried out by thickening and/or filtration with or without added flocculant, the solution is combined with another portion of solution which is withdrawn from the purification-dehydration 70 (to be described) and the combined solutions are passed to the purification-dehydration 70.

The amount of the portion of withdrawn solution passed to dissolution 50 and that of the portion which is combined with the impure sodium carbonate solution from separation 60 are chosen such that the combined solution added to purification-dehydration 70 is unsaturated with respect to its sodium carbonate content. An increase in the sodium carbonate concentration of about 20 to 50 g/L between solution withdrawn from purification-dehydration 70 and the combined solution added to purification-dehydration 70 can usually be allowed. If desired, additional water may be added to dissolution 50 or following liquid-solids separation 60.

The purification-dehydration 70 is carried out in a non-convective solar pond (NCSP), wherein sodium carbonate crystallizes as sodium carbonate decahydrate and the decahydrate is dehydrated to form sodium carbonate monohydrate.

It has been surprisingly discovered that a separation of salts, specifically the separation of sodium carbonate from impurity salts, can be carried out in an NCSP. Accordingly, a pure sodium carbonate monohydrate product substantially free of impurity salts can be recovered from an NCSP to which is added a sodium carbonate solution containing significant amounts of dissolved impurity salts such as sodium sulfate and sodium chloride.

The soluble impurities enter the NCSP with the impure sodium carbonate solution and the concentration of the impurities in the pond gradually increases until a steady state concentration is reached which is usually maintained by withdrawing an amount of solution from the NCSP. It has been discovered that the concentration of each impurity, particularly sodium chloride and sodium sulfate, is not homogeneous throughout the pond and that each impurity has a concentration gradient. In an evaporative solar pond, concentration gradients normally do not occur. For an NCSP, it would be expected that the salt concentration would increase with increasing depth and that the gradient, especially for sodium sulfate which has a higher and a lower hydrated form, would be similar and parallel to the gradient established for the sodium carbonate. To the contrary, it has been surprisingly discovered that the impurity salts, having concentrations below saturation concentrations under the conditions prevailing in the top portion of the NCSP, each has a concentration gradient which is opposite to that for sodium carbonate which is present in near saturation concentration. In other words, in an NCSP operating under steady-state conditions, the concentrations of sodium sulfate and chloride are highest in the top layer of the pond and decrease downward to the bottom layer, where they reach their lowest values.

In carrying out the purification and dehydration, the unsaturated, impure sodium carbonate solution is fed to the top layer of the NCSP of purification-dehydration 70. This feed solution to the top layer of the NCSP comprises solution from liquid-solids separation 60 combined with a portion of the solution withdrawn from the pond. Water lost through evaporation is replenished by adding at least an equivalent amount of water either directly to the top of the NCSP, or to dissolution 50, or together with the feed to the NCSP from liquid-solids separation 60. The additions of carbonate solution and any water are preferably made at one area of the top layer of the NCSP by suitable means, such as a distribution device which distributes the additions across the surface of the NCSP. The NCSP is preferably operated at a constant depth on a seasonally adjusted basis and the depth is maintained at a value of up to about 3 m, preferably in the range of about 1 to 2 m.

Sodium carbonate decahydrate crystallizes from the added impure sodium carbonate solution by cooling and/or evaporation in the top layer of the pond. The crystals travel downward and are dehydrated in the bottom layer of the pond at a temperature at or above the decahydrate-monohydrate transition temperature to sodium carbonate monohydrate. The monohydrate crystals are removed from the bottom of the pond.

To remove the impurities from the NCSP, solution is withdrawn from the top layer of the pond, where the impurity salts have their highest concentrations. For example, solutions containing as high as 80 g/L sodium sulfate have been removed from the top layer of the pond, while the feed solution to the NCSP contained only 50 g/L or less. The concentrations of $Na_2SO_4$ in the solutions fed to and withdrawn from the NCSP are based on a continuously circulating flow through the pond and the dissolution, an incremental amount of 1 g/L $Na^2SO_4$ being added to the circulating solution by dissolving solid salt. The withdrawal is preferably made from a location in the pond removed from the area in which impure sodium carbonate solution is added to the surface of the pond. When the withdrawal is made away from the area of carbonate solution addition, short circuiting of feed solution is not observed to occur. The withdrawn solution is a substantially saturated or nearly saturated solution with respect to sodium carbonate at the temperature prevailing in the top layer of the pond and contains increased concentrations of impurity salts compared to the feed solution. Thus, the pond has the capability of generating and rejecting a solution with a high $SO_4=/CO_3=$ ratio from a calcination product which has a much lower $SO_4=/CO_3=$ ratio. The major portion of the withdrawn solution is split in three portions, a first portion being fed to dissolution 50 and a second portion being recycled on the NCSP after combining with the solution from liquid-solids separation 60 following dissolution 50 and optional removal of organics. A third minor portion of the withdrawn solution is purged and, if desired, may be fed to raw salt leach 20, as indicated by the broken line. As described, the carbonate content of the purged solution is substantially precipitated in leach 20 and its impurity salt content is removed with the solution separated from the leach slurry. The relative amount of each of the three portions is adjusted to maintain the desired material balance in the process and to ensure that the feed solution to the NCSP remains unsaturated with respect to sodium carbonate, as described above.

As a result of the purification of the sodium carbonate in the purification-dehydration 70, a high-purity sodium carbonate monohydrate substantially free of impurity salts and meeting the specifications of commerce, is removed from the bottom of the pond. The removed monohydrate is preferably washed and then converted to dense soda ash in conversion 80 by any one of a number of known methods. Known methods include repulping of the monohydrate and crystallizing anhydrous sodium carbonate above the transition temperature of 109° C., or by calcination, or by melting the monohydrate, crystallizing and converting to the anhydrous form. The dense soda ash is recovered as product.

The process according to the invention will now be illustrated by the following non-limitative examples.

EXAMPLE 1

A raw salt leach according to the invention was carried out by making five successive additions of 200 g solid salt from the Owens Lake salt deposit to 1 L of brine. After each addition, the leach slurry was agitated and sampled before the next addition of salt was made. The leach temperature was 20° C. and no carbon dioxide was added. The brine was recycled process brine saturated with $NaHCO_3$, its composition being in the bicarbonate-field of the phase diagram. The samples of leach slurry were filtered and filtercake and filtrate analyzed. The results of analyses of feed and samples are given in Table I and are shown in the applicable phase diagram shown in FIG. 3. (The sample numbers correspond to the brine and solids composition of the same number in the diagram of FIG. 3.)

TABLE I

|  | $Na_2CO_3$ | $NaHCO_3$ | $Na_2SO_4$ | $NaCl$ |
| --- | --- | --- | --- | --- |
|  | Solution Analyses in g/L | | | |
| Feed Brine | 143.6 | 47.5 | 8.6 | 9.5 |
| Feed Salt | | | | |
| Sample 1 | 170.8 | 38.2 | 34.0 | 27.8 |
| Sample 2 | 174.1 | 31.2 | 56.8 | 48.5 |
| Sample 3 | 175.3 | 29.4 | 72.5 | 65.4 |
| Sample 4 | 143.1 | 18.9 | 115.4 | 87.7 |
| Sample 5 | 135.2 | 9.8 | 121.3 | 111.0 |
|  | Solids Analyses in % | | | |
| Feed Brine | | | | |
| Feed Salt | 34.8 | 19.6 | 12.10 | 10.00 |
| Sample 1 | 34.7 | 30.9 | 0.36 | 0.29 |
| Sample 2 | 38.7 | 31.8 | 0.62 | 0.53 |
| Sample 3 | 41.2 | 30.7 | 1.00 | 0.90 |
| Sample 4 | 41.7 | 29.4 | 0.58 | 0.44 |
| Sample 5 | 44.4 | 33.8 | 1.85 | 1.69 |

Figure 3:
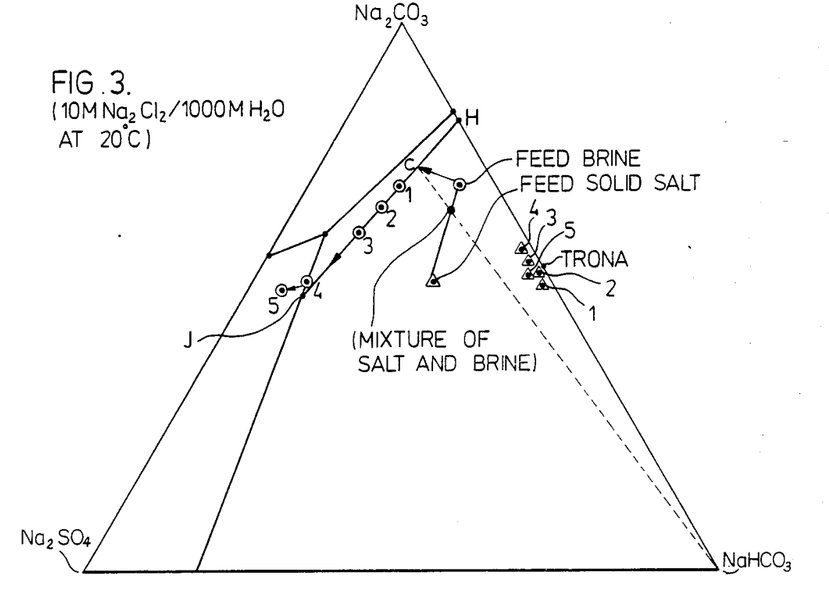
FIG. 3 shows the phase diagram appropriate to the test of Example 1.

It can be seen from these results that the solids of all samples have a composition, with respect to the carbonate-bicarbonate contents, which is close to that of trona, and the solution composition of sample 4 is close to that of point J, i.e. J brine, in the phase diagram. The fifth addition of solid salt resulted in a brine composition (Sample 5) which is in the sodium sulfate field of the phase diagram and, thus, saturated with sodium sulfate. It follows that the leach according to the process of the invention results in the production of trona and J brine.

EXAMPLE 2

Figure 4:
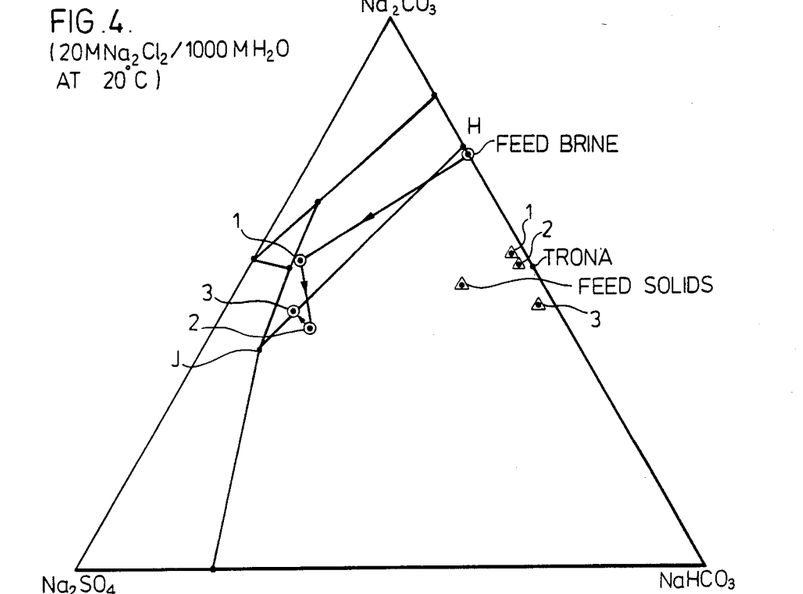
FIG. 4 shows the phase diagram appropriate to the test of Example 2.

The raw salt leach was carried out with a solid salt having a composition similar to the one of Example 1 and with a recycled process-brine saturated with respect to $NaHCO_3$ but free of $Na_2SO_4$ and $NaCl$. The feed brine composition is close to the trona-bicarbonate saturation line (H–J line) of the applicable phase diagram, which is shown in FIG. 4. For this test, 1000 g of solid salt was added to one L brine at 20° C. and the mixture was agitated for one hour, after which the slurry was sampled. Carbon dioxide was then added at a rate of 15 ml $CO_2$/sec per 1000 ml brine for 30 minutes. The slurry was sampled. Carbonation was continued at the same rate for another 90 minutes and a third sample taken. The samples were filtered and the cakes and filtrates were analyzed. The results of analyses are given in Table II and the solid salt, feed brine and samples compositions are shown in FIG. 4.

TABLE II

|  | $Na_2CO_3$ | $NaHCO_3$ | $Na_2SO_4$ | $NaCl$ |
| --- | --- | --- | --- | --- |
|  | Solution Analyses in g/L | | | |
| Feed Brine | 148.0 | 45.0 | 0 | 0 |
| Sample 1 | 117.2 | 13.6 | 126.2 | 77.6 |
| Sample 2 | 86.6 | 27.4 | 132.1 | 79.1 |
| Sample 3 | 89.7 | 21.8 | 132.1 | 79.1 |
|  | Solids Analyses in % | | | |
| Feed Solids | 36.7 | 24.6 | 13.6 | 8.2 |
| Sample 1 | 43.2 | 31.0 | 3.1 | 2.4 |
| Sample 2 | 44.3 | 31.1 | 3.3 | 2.4 |

TABLE II-continued

|  | $Na_2CO_3$ | $NaHCO_3$ | $Na_2SO_4$ | NaCl |
|---|---|---|---|---|
| Sample 3 | 38.4 | 38.8 | 2.2 | 2.1 |

The results show that carbonation will return the brine composition to the H-J line in the phase diagram. In this leach, the carbonation of 30 minutes was somewhat too long, yielding a brine containing bicarbonate. Further carbonation returned the brine composition to the H-J line but yielded a solids composition containing trona as well as some free sodium bicarbonate. The addition of $CO_2$ should, therefore, be carefully controlled to ensure that the brine compositions are retained on the H-J line and the solids are substantially hydrate which dehydrates to the monohydrate in the lower portion of the pond. The top layer of the NCSP is at 25° C. and has a density of 1.20. The bottom layer of the pond is at 39° C. and has a density of 1.34. Water lost from the pond by evaporation is replenished. A volume of brine is removed from the top layer of the pond at a point away from the area where the feed solution is distributed to the pond. The removed brine is recycled to dissolution 50. Sodium carbonate monohydrate is removed from the bottom of the NCSP. The monohydrate crystals are washed and subjected to a conversion 80 in an oven at 105° C. for the production of a pure soda ash as final product. Amounts of the solutions and solids and their compositions are tabulated in Table III.

TABLE III

| Material | Weight or Volume | Analyses | | | | Insolubles | Weight in kg | | | | Insolubles |
|---|---|---|---|---|---|---|---|---|---|---|---|
|  |  | $Na_2CO_3$ | $NaHCO_3$ | $Na_2SO_4$ | NaCl |  | $Na_2CO_3$ | $NaHCO_3$ | $Na_2SO_4$ | NaCl |  |
| raw salt | 720 kg | 35.3% | 21.6% | 12.0% | 8.9% | 9.7% | 254.2 | 155.5 | 86.4 | 64.1 |  |
| recycle brine | 800 L | 148.2 g/L | 43.5 g/L | 9.1 g/L | 9.5 g/L | — | 118.6 | 34.8 | 7.3 | 7.6 |  |
| feed to leach |  |  |  |  |  |  | 372.8 | 190.3 | 93.7 | 71.7 |  |
| leach solution after 30' leach | 815 L | 148 g/L | 21 g/L | 106 g/L | 88 g/L | — | 120.6 | 17.1 | 86.4 | 71.7 |  |
| leach residue after 30' leach | 590 kg | 42.7% | 29.4% | 1.2% | 0.0% | 11.8% | 252.2 | 173.2 | 7.3 | 0.0 | 69.0 |
| $CO_2$ added | 10.2 kg |  |  |  |  |  |  |  |  |  |  |
| carbonated leach solution | 800 L | 120 g/L | 26 g/L | 116 g/L | 90 g/L | — | 96.0 | 20.8 | 92.8 | 71.7 |  |
| carbonated leach residue | 630 kg | 40.0% | 33.0% | 0.1% | 0.0% | 11.0% | 252.2 | 208.2 | 0.9 | 0.0 | 69.0 |
| brine entrained in carbonated leach residue | 120 L | 120 g/L | 26 g/L | 116 g/L | 90 g/L | — | 14.4 | 3.1 | 14.8 | 10.8 | — |
| calciner feed | 782 kg | 34.0% | 27.0% | 2.0% | 1.4% | 8.8% | 266.6 | 211.3 | 15.7 | 10.8 | 69.0 |
| calcined salt to dissolution | 496 kg | 80.6 kg | 0.0 kg | 3.2% | 2.2% | 13.9% | 400.0 | 0.0 | 15.7 | 10.8 | 69.0 |
| recycle brine from NCSP to dissolution | 5000 L | 240 g/L | 0.0 g/L | 65.0 g/L | 16.0 g/L | — | 1200 | 0.0 | 325 | 80.0 | — |
| solution to NCSP | 5240 L | 305 g/L | 0.0 g/L | 65.0 g/L | 17.4 g/L | — | 1600 | 0.0 | 341 | 90.8 | 0.0 |
| washed $Na_2CO_3.H_2O$ | 470 kg | 85.0% | 0.0% | 0.0% | 0.0% | 0.0% | 400 | 0.0 | 0.0 | 0.0 | 0.0 |
| soda ash | 400 kg | 100.0% | — | — | — | — | 400 |  |  |  |  | trona.

EXAMPLE 3

Figure 5:
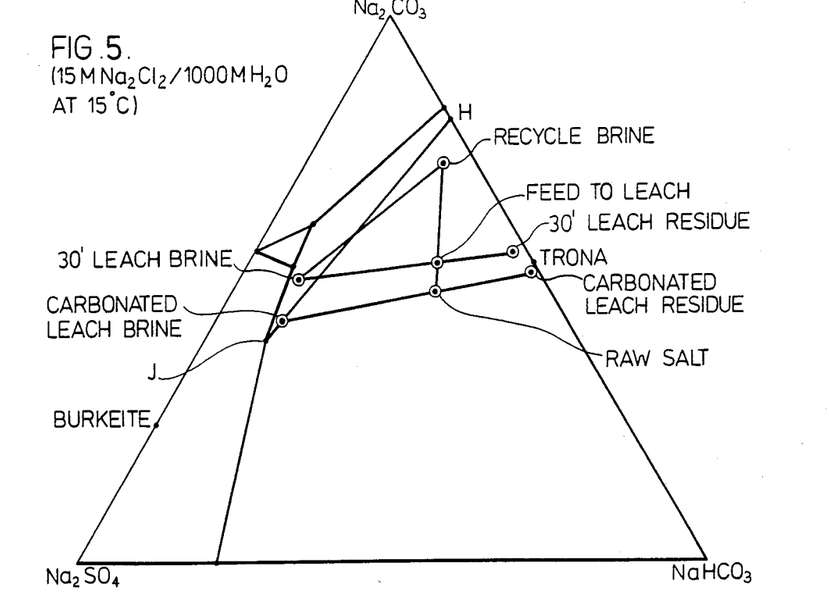
FIG. 5 shows the phase diagram appropriate to the operation of the process according to Example 3.

This example illustrates the process of the invention operated according to the flow diagram shown in FIG. 2 and the appropriate phase diagram according to FIG. 5.

An amount of raw salt and accompanying brine from the Owens Lake salt deposit is subjected to size reduction 10 by dry grinding and the pulverized −28 mesh salt is mixed with a volume of recycle brine. The slurry, containing 41.5% solids by weight, is fed to the raw salt leach 20, conducted at a temperature of 20° C. and agitated. After 30 minutes 10.2 kg $CO_2$ is sparged into the leach slurry over a period of 15 minutes.

After completion of the leach 20, the leach slurry is subjected to L/S separation 30 and the liquid fraction (J brine) is removed. The solids fraction is fed to a kiln and calcined 40 at 205° C.

The calcine is dissolved in dissolution 50 in brine recycled from the top of the non-convective solar pond (NCSP) of purification-dehydration 70. The dissolution is maintained at 30° C. with the addition of steam. Some make-up water is added. The solution from dissolution 50, after removal of insolubles by filtration 60, is distributed to the top layer of the NCSP 70 wherein the carbonate content of the solution crystallizes as the deca- The compositions of the raw salt, the recycle brine, the combined feed to the leach, the leach solution and the leach reside are shown in the $Na_2CO_3$—$NaHCO_3$—$Na_2SO_4$ phase diagram for 20° C. and 15 moles $Na_2Cl_2/1000$ moles $H_2O$ in FIG. 5. The composition for each point is also given in Table IV.

TABLE IV

| Material | $Na_2CO_3$ % | $NaHCO_3$ % | $Na_2SO_4$ % |
|---|---|---|---|
| raw salt | 51.2 | 31.3 | 17.5 |
| recycle brine | 73.8 | 21.7 | 4.5 |
| feed to leach | 56.7 | 29.0 | 14.3 |
| brine after 30' leach | 53.9 | 7.6 | 38.5 |
| residue after 30' leach | 58.3 | 40.0 | 1.7 |
| carbonated leach brine | 45.8 | 9.9 | 44.3 |
| carbonated leach residue | 54.0 | 45.8 | 0.2 |

The results show that the process of the invention yields pure soda ash in a good yield. The composition of the carbonated leach residue is essentially that of trona and the composition of the carbonated leach solution approaches the composition of that of J brine. The results further show that sodium carbonate can be separated from accompanying impurity salts in a non-convective solar pond and that a pure sodium carbonate monohydrate essentially free of sodium chloride and sodium sulfate can be recovered from the pond.

EXAMPLE 4

This example illustrates that a separation-purification of salts can be carried out in a non-convective solar pond (NCSP).

A brine was fed to an operating NCSP from the dissolution step. The NCSP had a bottom surface area of 400 m² and held 270 m³ brine at an average depth of 0.62 m. The feed brine was distributed at a rate of 70.9 t/d to one side of the top portion of the pond. The feed brine contained 390 g/L $Na_2CO_3$, 50 g/L $Na_2SO_4$ and 5.0 g/L NaCl. The sodium carbonate crystallized as its decahydrate and the decahydrate settled towards the bottom portion of the pond where it dehydrated to the monohydrate form. After steady-state conditions were established in the NCSP, additional amounts of sodium sulfate and sodium chloride were added to the pond over a period of one month operation. Total amounts of 3t $Na_2SO_4$ and 1.5t NaCl were added.

Three days after the additions were completed, monohydrate was removed from the bottom of the pond and, after analysis, was found to contain 0.08% $Na_2SO_4$ and 0.04% NaCl. After washing of the monohydrate crystals with a small quantity of water, the $Na_2SO_4$ and NaCl contents had been substantially removed. Brine was removed from the top portion of the pond at a location at a depth of 2.5 cm well removed from the area of the distribution of feed brine. The removed brine was analyzed and found to contain 5.2% $Na_2SO_4$ and 1.3% NaCl by weight.

Brine samples were taken at a number of points at increasing depths from the surface of the pond. The samples were analyzed. The temperature and brine density were also measured at various depths and the values recorded. Test results are tabulated in Table V.

TABLE V

| Depth cm | Temp. °C. | Density g/cm³ | $Na_2CO_3$ % | $Na_2SO_4$ g/L | $Na_2SO_4$ % | NaCl g/L | NaCl % |
|---|---|---|---|---|---|---|---|
| 2.5 |  |  | 20 | 65.1 | 5.2 | 16.1 | 1.3 |
| 5. | 22.0 | 1.294 | 29 | 55.3 | 4.3 | 13.8 | 1.1 |
| 7.5 |  |  |  | 33.7 | 2.6 | 8.8 | 0.7 |
| 10 |  |  |  | 21.0 | 1.5 | 5.3 | 0.4 |
| 25 | 34.5 | 1.348 | 32 |  |  |  |  |
| 35 | 36.5 | 1.358 | 33 |  |  |  |  |
| 45 | 37.0 | 1.360 |  | 17.9 | 1.3 | 3.8 | 0.3 |
| 55 | 37.5 | 1.362 |  |  |  |  |  |

Two further samplings were made at different times of day. The results measured at 0 and 45 cm depths are shown in Table VI.

TABLE VI

| Depth cm | Temp. °C. | Density g/cm³ | $Na_2CO_3$ % | $Na_2SO_4$ g/L | $Na_2SO_4$ % | NaCl g/L | NaCl % |
|---|---|---|---|---|---|---|---|
| 0 | 18.0 | 1.253 | 25 | 79.3 | 6.3 | 23.4 | 1.0 |
| 45 | 33.0 | 1.358 | 33 | 17.0 | 1.2 | 4.2 | 0.3 |

A brine containing 79.3 g/L $Na_2SO_4$ and 23.4 g/L NaCl was removed from the top of the pond. $Na_2CO_3.H_2O$ containing 0.08% $Na_2SO_4$ and 0.04% NaCl was removed from the bottom of the pond.

Example 4 clearly shows that an impure sodium carbonate brine can be fed to an NCSP even when containing increased amounts of impurity salts, that the monohydrate recovered from the pond is substantially pure and that the impurity salts accompanying the sodium carbonate brine fed to the pond are substantially removed with the brine removed from the top portion of the NCSP. It can also be seen that the concentration of $Na_2SO_4$ in the top layer of the pond can be as high as 80 g/L (6.3%). The concentrations of the $Na_2SO_4$ and NaCl at various depths show that these salts have concentration gradients in opposite direction compared to the $Na_2CO_3$ concentration gradient. It is noted that if 80 g/L $Na_2SO_4$ were present in the bottom portion of the pond, $Na_2SO_4$ would have co-precipitated with $Na_2CO_3.H_2O$.

EXAMPLE 5

This example illustrates the raw salt leach and the preferred embodiment of the subsequent liquid-solids separation employing a thickener and a horizontal belt filter.

An amount of raw salt and accompanying brine from the Owens Lake salt deposit was subjected to size reduction and the −28 mesh salt was mixed with a volume of recycled wash filtrate from the belt filter. The resulting slurry was fed to the raw salt leach conducted at 20° C. for one hour.

After completion of the leach, the leach slurry was subjected to liquid-solids separation. The slurry was fed to a thickener and settled. The thickener overflow was discharged to a settling pond and the underflow was mixed with 0.01 g of a polyacrylamide flocculant per kg of filter feed solids and passed onto a horizontal belt filter. The solids fraction on the filter was washed with water followed by steaming and the filter cloth was washed with water. The resulting weak solution was recycled for mixing with the pulverized raw salt. The liquid fraction from the belt filter, which was substantially J brine, was passed to the settling pond.

Figure 6:
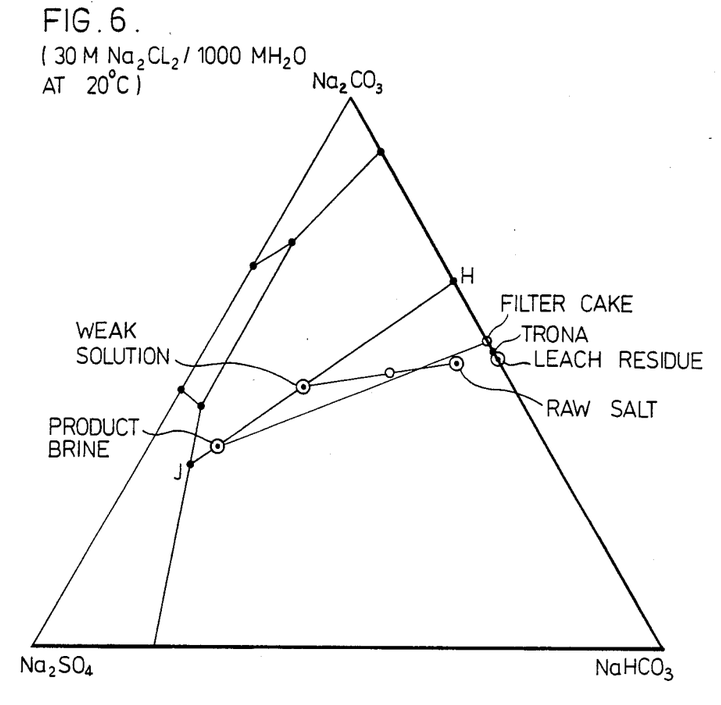
FIG. 6 shows the phase diagram appropriate to the operation of the process according to Example 5.

The test results are given in Table VII and the compositions of the raw salt, product brine, weak solution, leach residue and filtercake are shown in the appropriate phase diagram of FIG. 6.

TABLE VII

|  | weight kg/min | volume L/min | S.G. kg/L | Assays (Solids in %; Liquids in g/L) | | | | | | |
|---|---|---|---|---|---|---|---|---|---|---|
|  |  |  |  | $Na_2CO_3$ | $NaHCO_3$ | NaCl | $Na_2SO_4$ | INSOL | $Na_2O$ | $H_2O$ |
| raw salt | 33.4 | 15.5 | 2.150 | 33.0 | 25.3 | 12.5 | 4.6 | 5.9 | 28.6 | 7.9 |
| weak solution | 27.9 | 23.9 | 1.167 | 43.0 | 19.8 | 61.2 | 30.1 | — | 33.0 | — |
| leach residue | 24.6 |  | 2.150 | 40.8 | 34.0 | 0.0 | 0.6 | 7.6 | 36.4 |  |
| leach solutions thickener | 35.4 | 28.6 | 1.240 | 63.7 | 17.9 | 182.2 | 89.5 | 0.0 | 43.9 | 0.0 |
| O/F dry solids | 1.5 |  |  | 20.0 | 37.2 |  |  | 30.5 | 25.4 |  |
| O/F brine | 13.2 | 10.6 | 1.240 | 63.7 | 17.9 | 182.2 | 89.5 | 0.0 | 43.9 | 0.0 |
| U/F dry solids | 23.0 |  |  | 39.9 | 32.2 | 1.0 | 1.3 | 5.0 | 35.2 |  |
| U/F brine | 21.1 | 17.0 | 1.239 | 69.3 | 16.8 | 173.4 | 82.7 | 0.0 | 46.7 | 0.0 |
| filter feed solids | 23.0 |  |  | 39.9 | 32.2 | 1.0 | 1.3 | 5.0 | 35.2 |  |

TABLE VII-continued

| | | | | | | | | | | |
|---|---|---|---|---|---|---|---|---|---|---|
| feed brine | 21.1 | 17.0 | 1.239 | 69.3 | 16.8 | 173.4 | 82.7 | 0.0 | 46.7 | 0.0 |
| cake wash | 4.8 | 4.8 | 1.000 | | | | | | | |
| steam | 1.3 | 1.3 | 1.000 | | | | | | | |
| cloth wash | 14.5 | 14.5 | 1.000 | | | | | | | |
| cake | 23.0 | | | 38.4 | 29.3 | 0.1 | 0.3 | 6.3 | 33.3 | 11.8 |
| primary filtrate | 10.5 | 8.5 | 1.234 | 64.4 | 20.5 | 173.4 | 83.3 | | 45.2 | |
| wash filtrate | 14.3 | 11.7 | 1.223 | 89.4 | 37.6 | 123.6 | 61.3 | | 66.2 | |
| cloth wash | 14.5 | 14.5 | 1.000 | 19.1 | 16.6 | | | | 17.3 | |

| | weight (kg) | | | | | | distribution (%) | | | |
|---|---|---|---|---|---|---|---|---|---|---|
| | $Na_2CO_3$ | $NaHCO_3$ | NaCl | $Na_2SO_4$ | INSOL | $Na_2O$ | NaCl | $Na_2SO_4$ | INSOL | $Na_2O$ |
| leach | | | | | | | | | | |
| raw salt | 11.0 | 8.5 | 4.2 | 1.5 | 2.0 | 9.6 | | | | |
| weak solution | 1.0 | 0.5 | 1.5 | 0.7 | 0.0 | 0.8 | | | | |
| residue | 10.0 | 8.4 | 0.0 | 0.1 | 1.9 | 9.0 | | | | |
| solution | 1.8 | 0.5 | 5.2 | 2.6 | 0.0 | 1.3 | | | | |
| thickener | | | | | | | | | | |
| O/F dry solids | 0.3 | 0.5 | | | 0.4 | 0.4 | | | 27.8 | 3.8 |
| O/F brine | 0.7 | 0.2 | 1.9 | 1.0 | 0.0 | 0.5 | 37.8 | 36.0 | 0.0 | 4.8 |
| U/F dry solids | 9.2 | 7.4 | 0.2 | 0.3 | 1.2 | 8.1 | 4.7 | 11.0 | 72.2 | 83.2 |
| U/F brine | 1.2 | 0.3 | 2.9 | 1.4 | 0.0 | 0.8 | 57.5 | 53.0 | 0.0 | 8.2 |
| filter | | | | | | | | | | |
| feed solids | 9.2 | 7.4 | 0.2 | 0.3 | 1.2 | 8.1 | | | | |
| feed brine | 1.2 | 0.3 | 2.9 | 1.4 | 0.0 | 0.8 | | | | |
| cake wash | | | | | | | | | | |
| steam | | | | | | | | | | |
| cloth wash | | | | | | | | | | |
| cake | 8.8 | 6.7 | 0.0 | 0.1 | 1.5 | 7.7 | 0.3 | 4.9 | | 94.3 |
| primary filtrate | 0.5 | 0.2 | 1.5 | 0.7 | 0.0 | 0.4 | | | | |
| wash filtrate | 1.0 | 0.4 | 1.4 | 0.7 | 0.0 | 0.8 | | | | 4.5 |
| cloth wash | 0.3 | 0.2 | | | | 0.3 | | | | 2.6 |

As can be seen from the tabulated results, the composition of the product solids (filter cake) is that of trona and the composition of the final solution is that of J brine. The extraction of both chloride and sulfate was high. The use of a thickener and a horizontal belt filter made it possible to thoroughly remove the solute from the solids, thereby reducing the amount of bleed in the subsequent processing of the solids.

It will be understood of course that modifications can be made in the embodiments of the invention described and illustrated herein without departing from the scope and purview of the invention as defined in the appended claims.

We claim:

1. A process for the recovery of sodium carbonate from salt deposits comprising sodium carbonate, sodium bicarbonate, sodium sulfate, sodium chloride, trona and burkeite, which process comprises subjecting solid raw salt obtained from such deposits to a raw salt leach with a solution substantially saturated with sodium bicarbonate whereby the sodium sulfate, sodium chloride, and burkeite are preferentially dissolved into a leach solution and the trona is substantially left in a leach residue; maintaining a sodium chloride content in the leach of above about 5%; adding a controlled amount of carbon dioxide to the raw salt leach, said amount being sufficient to convert sodium carbonate released by the dissolution of the burkeite and the sodium carbonate in the raw salt to trona and insufficient to precipitate sodium bicarbonate; precipitating additional trona by the carbonation of sodium carbonate dissolved from the burkeite and the sodium carbonate in the raw salt; carrying out the leach so as to form a raw salt leach slurry of a raw salt leach residue consisting mainly of trona and a raw salt leach solution consisting of substantially J brine, said J brine approaching saturation with respect to sodium bicarbonate, trona and sodium sulfate; separating the leach solution of substantially J brine from the leach residue substantially consisting of trona; and recovering said trona.

2. A process for the recovery of sodium carbonate from solid salt deposits comprising sodium carbonate, sodium bicarbonate, sodium sulfate, sodium chloride, trona, burkeite and insolubles, which process comprises the steps of: subjecting the solid salts to a size reduction in a brine yielding a slurry substantially saturated with respect to sodium bicarbonate; retaining said slurry in a raw salt leach at a temperature above about 15° C. for a period of time; maintaining a sodium chloride content in the leach of above about 5%; adding a controlled amount of carbon dioxide, said amount being sufficient to convert sodium carbonate released by the dissolution of the burkeite and the sodium carbonate in the raw salt to trona and insufficient to precipitate sodium bicarbonate; said time and said amount of carbon dioxide being sufficient to form a raw salt leach slurry of a raw salt leach residue consisting mainly of trona and a raw salt leach solution consisting of substantially J brine, said J brine approaching saturation with respect to sodium bicarbonate, trona and sodium sulfate; separating said raw salt leach residue from said J brine in a liquid-solids separation carried out in one or more stages; removing said J brine; calcining the raw salt leach residue in a calcination carried out at a temperature in the range of about 200° to 400° C. to obtain impure sodium carbonate containing impurity salts; dissolving said impure sodium carbonate in a dissolution carried out at a temperature in the range of about 30° to 60° C. to obtain an impure sodium carbonate solution containing sodium chloride; sodium sulfate and insolubles; separating the insolubles from said impure sodium carbonate solution; feeding said impure sodium carbonate solution after separating the insolubles to a non-convective solar pond for the purification-dehydration of sodium carbonate; removing pure sodium carbonate monohydrate substantially free of said impurity salts from the bottom of said pond; withdrawing solution from the top of said pond;

feeding a first portion of said withdrawn solution to said dissolution; combining said impure sodium carbonate solution with a second portion of said withdrawn solution after separating the insolubles from said impure sodium carbonate solution and prior to feeding said impure sodium carbonate solution to said pond; and converting said pure sodium carbonate monohydrate to dense soda ash.

3. A process as claimed in claim 2, wherein a third and minor portion of the solution withdrawn from said pond is purged to said raw salt leach.

4. A process as claimed in claim 2, wherein said impure sodium carbonate solution fed to said non-convective solar pond is unsaturated with respect to sodium carbonate, the unsaturated impure sodium carbonate solution is distributed to one area of the top layer of said pond and solution is withdrawn from the top layer of said pond at a location removed from the area of distribution of the unsaturated impure sodium carbonate solution and wherein said pond is operated at a constant depth, which is maintained at a value of up to about 3 m.

5. A process as claimed in claim 2, wherein water evaporates from the top layer of the non-convective solar pond and the amount of evaporated water is replenished by adding at least an equivalent amount of water to the top layer of the pond.

6. A process as claimed in claim 2, wherein said pond is operated at a constant depth, which is maintained at a value of up to about 3 m.

7. A process as claimed in claim 4, wherein said depth is in the range of about 1 to 2 m.

8. A process as claimed in claim 2, wherein said liquid-solids separation is carried out in two stages in which the liquid-solids separations comprise the steps of passing the raw salt leach slurry to a thickener; adding to the thickener underflow a suitable flocculant; treating the thickener underflow with added flocculant on a horizontal belt filter; removing the thickener overflow and the liquid fraction from said belt filter consisting of substantially J brine from the process; and passing the solids fraction from said belt filter to said calcination.

9. A process as claimed in claim 2, wherein a portion of the removed J brine is recycled to said raw salt leach.

10. A process as claimed in claim 2, wherein a portion of the removed J brine is carbonated, sodium bicarbonate is crystallized and the crystallized sodium bicarbonate is passed to said calcination.

* * * * *